United States Patent [19]

Tomassian et al.

[11] Patent Number: 5,348,573
[45] Date of Patent: Sep. 20, 1994

[54] ANNULAR SCRUBBER

[75] Inventors: Edward Tomassian, Glendale; Nelson N. T. Young, Brea, both of Calif.

[73] Assignee: County Sanitation Districts of Los Angeles County, Whittier, Calif.

[21] Appl. No.: 67,452

[22] Filed: May 24, 1993

Related U.S. Application Data

[63] Continuation-in-part of Ser. No. 819,038, Jan. 10, 1992, abandoned.

[51] Int. Cl.$^5$ .................................................. B01D 53/04
[52] U.S. Cl. ........................................ 96/151; 96/152; 55/518
[58] Field of Search ............... 96/108, 151, 152; 210/283, 286; 55/516–519

[56] References Cited

U.S. PATENT DOCUMENTS

| | | | |
|---|---|---|---|
| 327,646 | 10/1885 | Bingham, Jr. | 210/283 |
| 400,736 | 4/1889 | Blake et al. | 210/283 |
| 1,993,142 | 3/1935 | Johnson | 210/283 |
| 2,055,774 | 9/1936 | Ray | 55/387 |
| 2,079,934 | 5/1937 | Fitch, Jr. et al. | 55/516 X |
| 2,080,578 | 5/1937 | Ray | 55/387 X |
| 2,362,933 | 11/1944 | Schaefer | 55/387 |
| 2,404,468 | 7/1946 | Vokes et al. | 55/387 |
| 2,450,533 | 10/1948 | Velten | 55/387 |
| 2,778,441 | 1/1957 | Herriott | 55/517 X |
| 3,347,026 | 10/1967 | Zankey | 55/387 X |
| 3,541,762 | 11/1970 | Ramaswami et al. | 55/517 X |
| 3,847,574 | 11/1974 | Fish | 55/387 |
| 3,853,483 | 12/1974 | Cross, Jr. | 55/387 X |
| 3,925,046 | 12/1975 | Hickey et al. | 55/387 |
| 3,926,599 | 12/1975 | Rudin et al. | 55/387 |
| 4,010,014 | 3/1977 | Barnebey et al. | 55/387 X |
| 4,318,720 | 3/1982 | Hoggatt | 55/517 X |
| 4,502,876 | 3/1985 | Behnke, Jr. et al. | 55/516 X |
| 4,541,851 | 9/1985 | Bosquain et al. | 55/387 X |
| 4,544,384 | 10/1985 | Metschl et al. | 55/387 X |
| 4,698,072 | 10/1987 | Rohde et al. | 55/387 X |
| 5,176,721 | 1/1993 | Hay et al. | 95/96 |

FOREIGN PATENT DOCUMENTS

| | | | |
|---|---|---|---|
| 3309497 | 9/1984 | Fed. Rep. of Germany | 55/387 |
| 906958 | 2/1946 | France | 55/387 |
| 981968 | 6/1951 | France | 55/387 |
| 61-178018 | 8/1986 | Japan | 96/152 |
| 61-209025 | 9/1986 | Japan | 55/387 |
| 62-191016 | 8/1987 | Japan | 55/387 |
| 01-070120 | 3/1989 | Japan | 55/387 |
| 01-159019 | 6/1989 | Japan | 55/387 |
| 01-164417 | 6/1989 | Japan | 55/387 |
| 874138 | 10/1981 | U.S.S.R. | 96/152 |
| 1223975 | 4/1986 | U.S.S.R. | 55/387 |
| 484049 | 4/1938 | United Kingdom | 55/517 |
| 2045107 | 10/1980 | United Kingdom | 55/387 |

Primary Examiner—Robert Spitzer
Attorney, Agent, or Firm—Robbins, Berliner & Carson

[57] ABSTRACT

A scrubber having a housing and a pair of replaceable and removable perforated casings within the housing. Preferably, the casings are cylindrical and concentric forming an inner corespace inside the innermost casing and an annular fillspace between the casings. A central, conical feeder at the top of the housing permits uniform distribution of treatment media into the annular fillspace. Circulation of exhaust gas through the scrubber is provided by a removable inlet pipe and removable outlet pipe. Contaminant-laden exhaust gas that is fed into the core, percolates through the treatment media and is discharged out through the housing. The stream of exhaust gas can be reversed without any modification to the internal or external parts of the scrubber. A plurality of removable horizontally extending cylindrical pipes secured to the lower end of the housing are used to remove the exhausted treatment media without disturbing surrounding piping through discharge ports secured to the lower end of the housing.

34 Claims, 4 Drawing Sheets

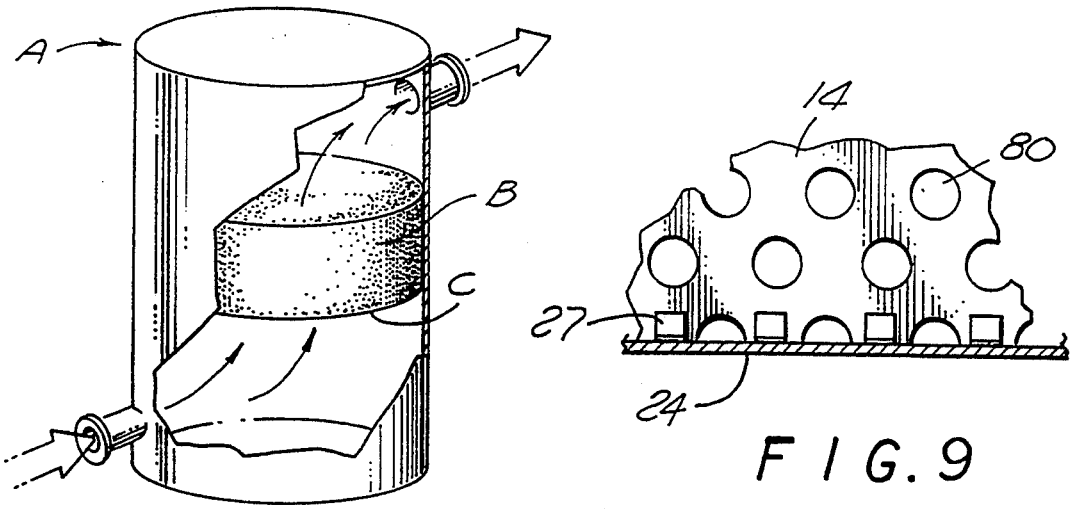
FIG. 1 PRIOR ART
FIG. 9
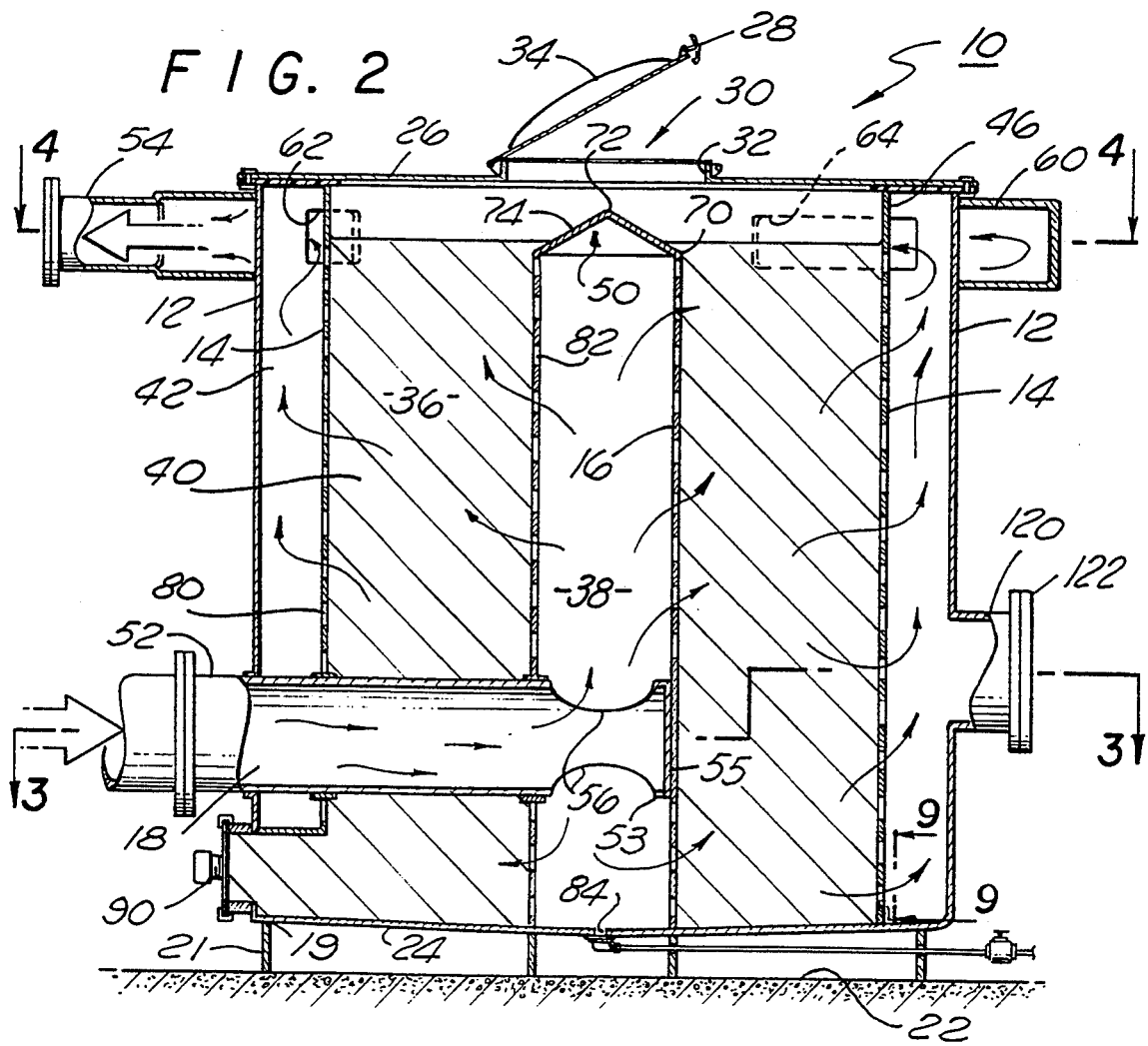
FIG. 2

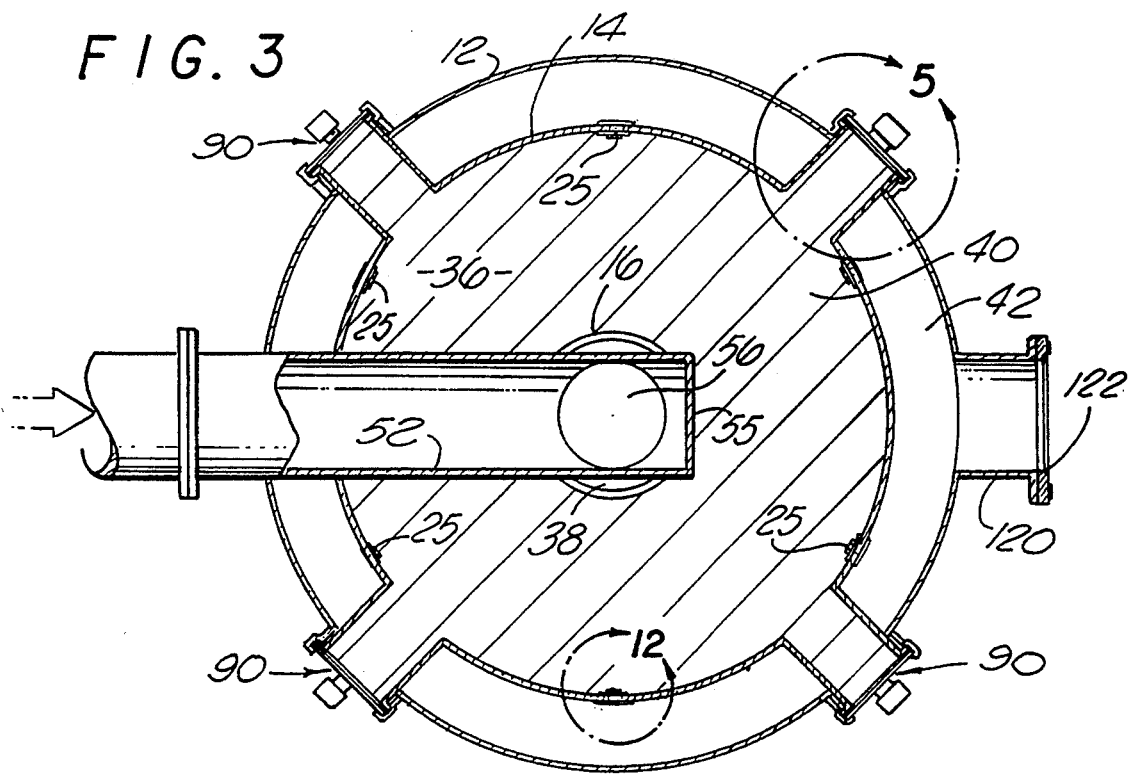
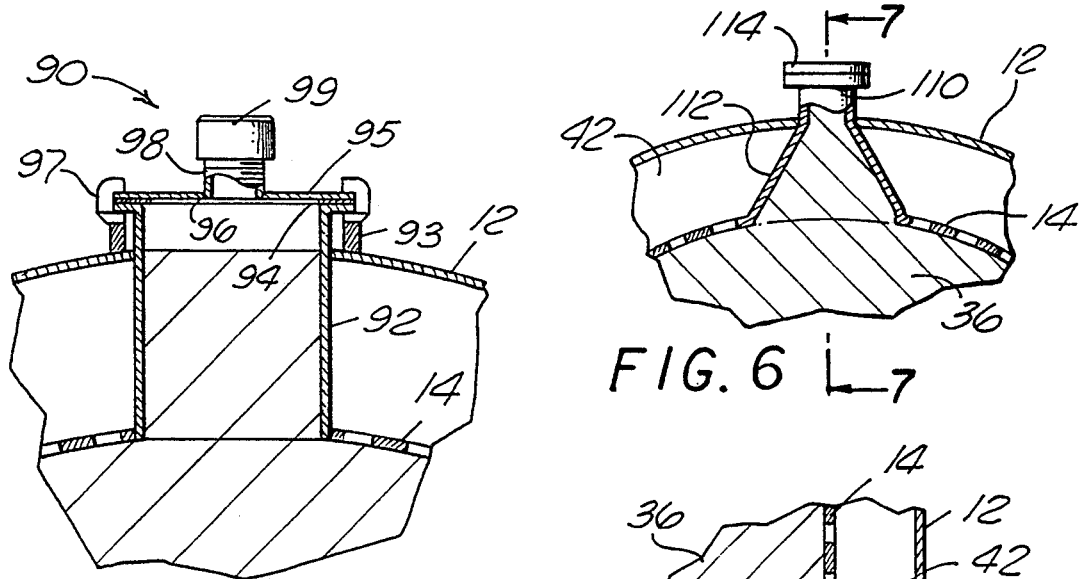

ANNULAR SCRUBBER

This application is a continuation-in-part of application Ser. No. 07/819,038, filed Jan. 10, 1992, now abandoned.

This invention relates to scrubbers that remove contaminants from exhaust air, and, in particular, to an activated carbon scrubber for removing volatile organic compounds from the exhaust gases emitted from wastewater treatment facilities and petroleum/chemical processing plants.

BACKGROUND OF THE INVENTION

Wastewater treatment and petroleum/chemical processes result in the emission of a wide assortment of odorous compounds, such as ammonia and organic sulphides, and volatile organic compounds. The stream of contaminant-laden exhaust air from sludge settling tanks, aeration tanks, wet wells, etc. must be treated to reduce odor or target pollutants below human smell recognition threshold levels and to reduce volatile organic compound levels before the airstream is discharged into the atmosphere. Various treatment technologies are currently being used to treat the exhaust air, including: combustion; scrubbing with water, caustics, bleach or other oxidants; filtration through odor filter piles or other media (carbon); dilution with fresh air; and final discharge and dispersion through elevated stacks.

Activated carbon is particularly useful in removing volatile organic compounds and odorous sulphur compounds from exhaust gas. Carbon adsorbs these contaminants. After a period of continuous use, however, carbon becomes exhausted, i.e., it loses its capacity to adsorb, and must be replaced.

A known system for treating exhaust gas using activated carbon involves directing the gas stream into the base of a cylindrical tank A (see FIG. 1). The gas flows upwardly, percolating through a bed B of carbon disposed across the tank, and then is discharged out the top of the tank. As the gas flows upwardly from the base, it first contacts a circular bottom surface C cf the carbon bed B which has a surface area of $\pi d_t^2/4$ (where $d_t$ is the inside diameter of the tank). In an alternative system, carbon beds may be stacked, one above the other, in a dual bed design such that the airstream will split between the beds. In this latter system, however, it is relatively more difficult to replace the carbon and oftentimes there is uneven flow distribution causing one bed to be exhausted before the other.

Practical adsorption capacity of the carbon bed is directly related to the surface area C of the bed and to the thickness of the bed. However, in view of pressure drop considerations, it is desirable that bed thickness be limited, i.e., a thicker bed requires a larger blower and more power to maintain the desired airstream velocity. Generally, a carbon bed thickness of about three feet is considered economical in treating exhaust air. If the air, however, contains significant amounts of contaminants, a further increase in bed thickness may be advisable.

A disadvantage of the tank in FIG. 1 is that adsorption capacity is primarily limited by the diameter of the tank. For high flow rates, the footprint of the tank will get very large. Additional or larger tanks may be constructed, but at higher cost for material and labor. The availability of land area poses another major problem for the location of additional or larger tanks. Also, if prefabricated tanks are used, they must remain small enough to permit transport from the fabricating facility to the treatment facility, thus limiting the cross-sectional surface area of the tank.

It is desired that a more efficient scrubber be designed that permits larger volumes of air to be treated over a given period of time in a smaller plot plan. Additionally, easy access into the scrubber must be provided to permit replacement of exhausted carbon. Furthermore, it is desirable to be able to reverse the air path through the scrubber due to process flow changes without modifying any of the internals of the tank. The capacity of the scrubber can be increased by simply increasing the height with the same diameter. The present invention achieves these goals by using an annular carbon bed.

In the case of a cylindrical tank having an annular carbon bed disposed upright inside the tank (see FIGS. 2-4), greater carbon surface area is available than with the same sized prior art tank (see FIG. 1) whenever $\pi d_e h$, the cylindrical surface area of the annular carbon bed is greater than $\pi d_t^2/4$, the circular surface area of the prior art carbon bed (where $d_e$ is the effective diameter of the annular carbon bed as described hereafter, h is the height of the bed and $d_t$ is the inside diameter of the prior art tank). Thus, greater volumes of exhaust air can be treated in the same diameter tank. Furthermore, designers may increase carbon surface area by increasing the height and/or diameter of the tank. This choice allows the designer to design the tank to fit a particular restricted location or to use a prefabricated tank having an overall size that is better adapted for transporting to a desired site. Additionally, the layout described herein allows for easy removal of exhausted carbon media and an expedient and uniform method of refilling the scrubber with carbon.

SUMMARY OF THE INVENTION

The present application describes a scrubber that significantly increases the surface area of carbon available for adsorbing exhaust gases and that has reversible flow capability with removable and reversible internals. The scrubber includes a housing having an inflow port and an outflow port. Inside the housing are a pair of spaced apart, perforated, removable concentric casings. The space between the casings is filled with activated carbon or other contaminant treating media. The casings are sealed (gasket or silicon) at the top and bottom and/or the housing is sealed and exhaust air is then introduced into the corespace inside the innermost casing. The exhaust air percolates through the carbon media in the space between the casings and flows out of the housing through the outflow port.

In the preferred embodiment, the casings are cylinders and the annular space between the casings is filled with activated carbon. Exhaust air flowing into the corespace of this scrubber will thus contact the carbon along a vertical cylindrical surface having a surface area of $\pi d h$, with h being the height or length of the cylinder. The adsorption capacity may be increased by increasing the height of the cylinder as well as its diameter.

Any shape may be used for the casings provided the inner casing encloses a corespace and a fillspace is formed between the inner casing and outer casing for receiving the contaminant treating media through which the exhaust air passes. Also, the air treatment process can occur in either direction, i.e., exhaust air may be introduced into the corespace, percolated through the media and then discharged through the housing outflow port or, alternatively, the exhaust air may be percolated through the media into the corespace, and then discharged from the corespace.

Another feature of the present invention is a conical feed mechanism disposed above the inner casing. When the annular fillspace between the casings is to be filled, carbon is fed through a single opening at the top of the housing onto a cone which uniformly distributes the carbon into the fillspace between the casings. Discharge ports are provided around the bottom of the housing for removing the carbon. When the ports are opened, carbon will either flow out on its own or may be shoveled or vacuumed out if necessary.

Additionally, since all the internals are removable, the flow capacity of the scrubber can be increased by simply removing the internals, extending the height of the scrubber and the internals, and placing them back in the scrubber.

BRIEF DESCRIPTION OF THE DRAWINGS

FIG. 1 is a fragmented elevational view of a prior art scrubbing apparatus.

FIG. 2 is a cross-sectional elevational view of a preferred embodiment of the present invention.

FIG. 3 is a cross-sectional plan view of the preferred embodiment taken along line 3—3 of FIG. 2.

FIG. 5 is an enlarged view of the carbon removal port shown in FIG. 3.

FIG. 6 is a plan view of an alternative embodiment of a carbon removal port.

FIG. 7 is a cross-sectional elevational view of the alternative carbon removal port taken along line 7—7 of FIG. 6.

FIG. 9 is an elevational view of the connection between the perforated casing and the bottom of the housing.

DETAILED DESCRIPTION OF THE INVENTION

Figure 4:
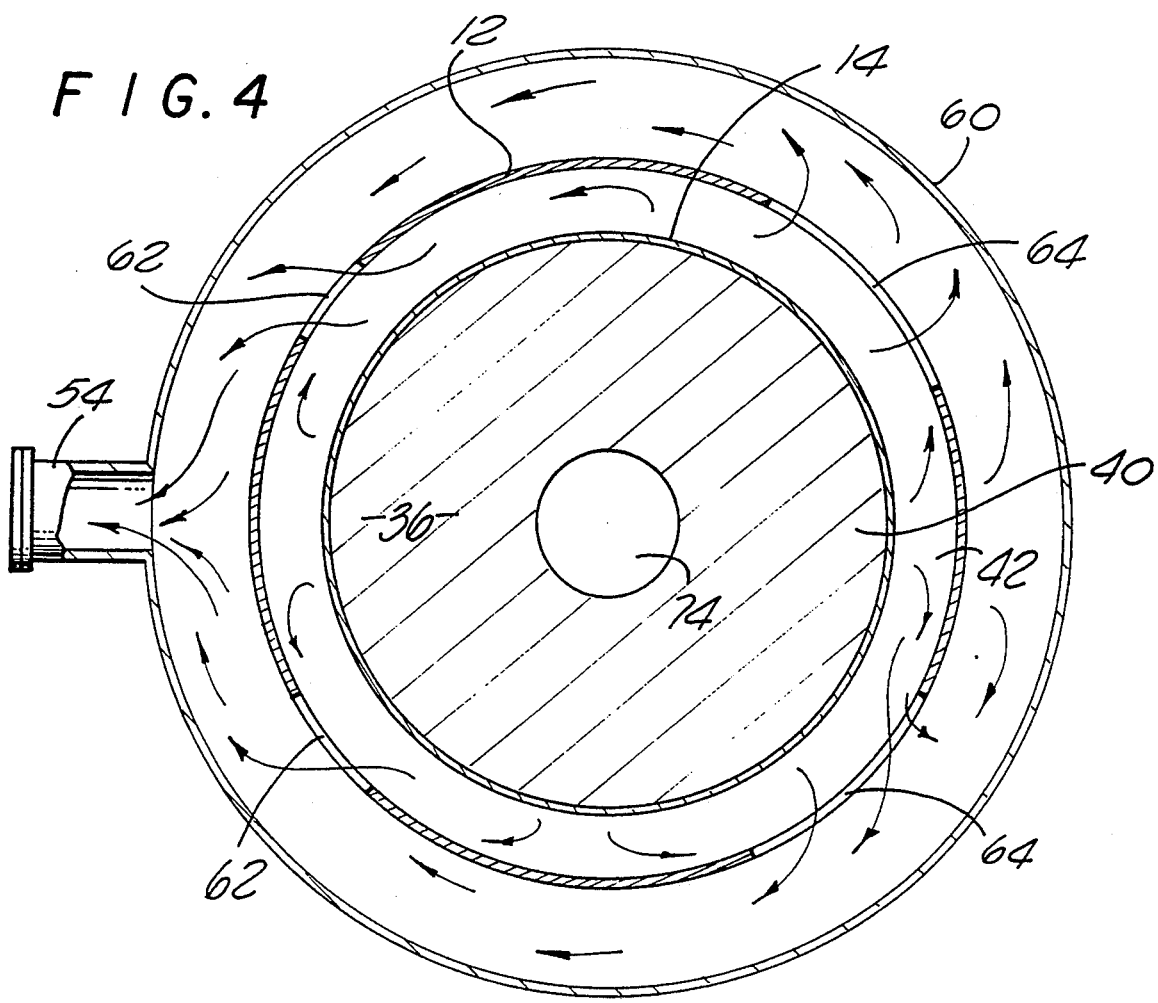
FIG. 4 is a cross-sectional plan view of the preferred embodiment taken along line 4—4 of FIG. 2.

A preferred scrubber 10 embodying the features of the present invention is shown in FIGS. 2–4. The scrubber 10 includes a cylindrical housing 12, an outer casing 14, an inner casing 16 and a bottom 24. The housing 12 may be made from fiberglass, stainless steel, concrete or other suitable material.

The housing 12 may be supported by a concrete slab 22 or a series of structural beams (not shown). A skirt 21 may be attached to the bottom 24 of the housing 12. In a preferred embodiment, the bottom 24 is sloped or has a conical surface (see FIG. 2) sloping downwardly toward the center of the scrubber for moisture drainage. An exterior edge 19 of the conically shaped bottom 24 is secured to the housing 12. Alternatively, the scrubber may be built without a bottom and set directly on the concrete slab and sealed (not attached) with gaskets. If the housing is to be prefabricated, lifting lugs (not shown) are welded or otherwise connected to the outside of the housing or other support.

The housing is also fitted with a lid 26 at its top. The lid 26 is removable. Quick clamps may be used if immediate access is desired. The lid 26 has a circular opening 30 at its center formed by a circular shoulder portion 32. A hinged cap 34 is then secured to the shoulder portion 32 and preferably has quick clamps 28 to permit easy opening of the cap. The cap 34 should form an airtight seal with the shoulder portion 32.

Inside the housing 12 are the removable outer casing 14 and the removable inner casing 16 with the outer casing 14 disposed between the inner casing 16 and the housing 12. Preferably, the casings are cylindrical and concentric with one another and with the housing. The inner casing 16 rests on the slab 22 and extends upwardly to a location below the cap 34. The outer casing 14 rests on the bottom 24 of the scrubber and extends upwardly, preferably being gasketed at the lid 26. When the scrubber 10 is built without a bottom, the outer casing 16 rests on the slab 22.

Figure 10:
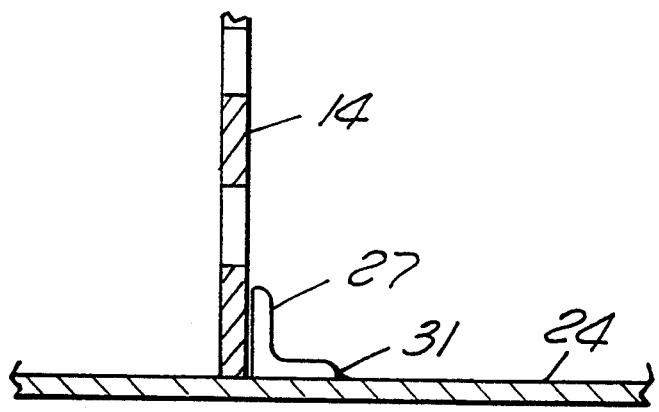
FIG. 10 is an enlarged view of the holding mechanism shown in FIG. 9.
Figure 11:
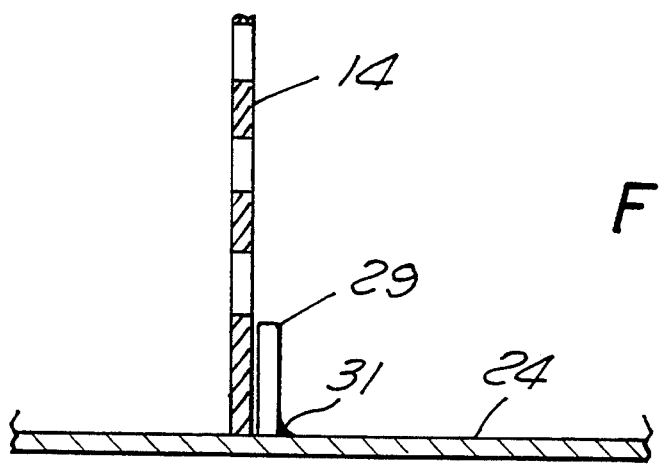
FIG. 11 is a cross-sectional elevational view of an alternate embodiment of a holding mechanism.

Inner and outer casings 14 and 16 are not permanently secured to the scrubber 10, making them replaceable and removable. A plurality of holding mechanisms, such as the angled member 27 shown in FIG. 9, nonpermanently hold the inner and outer casings 14 and 16 to the bottom 24. FIG. 10 is an enlarged view of the angled member 27 shown in FIG. 9. The angled member 27 is typically welded 31 to the bottom 24, and is bolted to the slab 22 if there is no bottom 24. The angled member is preferably constructed from steel, although it may be manufactured from any material which could support the inner and outer casings 14 and 16. Referring to FIG. 11, the holding mechanism can alternatively comprise a stop member 29 which, like the angled member 27, is welded 31 to the bottom 24 or embedded in the slab 22. Thus, in accordance with an advantage of the present invention, since the inner and outer casings 14 and 16 are attached to the slab 22 or bottom 24, inner and outer casings 14 and 16 are replaceable and removable.

The inner casing 16 surrounds a corespace 38. An annular fillspace 40 is formed between the inner and outer casings and receives a treatment media 36 for removing contaminants from exhaust gases. A voidspace 42 is formed between the outer casing 14 and the housing 12.

Both casings 14 and 16 have perforations 80, 82 respectively, to permit air to flow through them, yet the perforations 80, 82 must be small enough to prevent the escape of treatment media 36 from the annular fillspace 40. The preferred treatment media is activated carbon having a 4×8 mesh, although other size carbon may be used. Other contaminant treating media may also be used, such as iron sponge. The inner casing 16 is perforated around its perimeter and along its full length. The outer casing 14 is also fully perforated, except for an upper portion 46 thereof which should not be perforated for reasons explained later herein.

Figure 12:
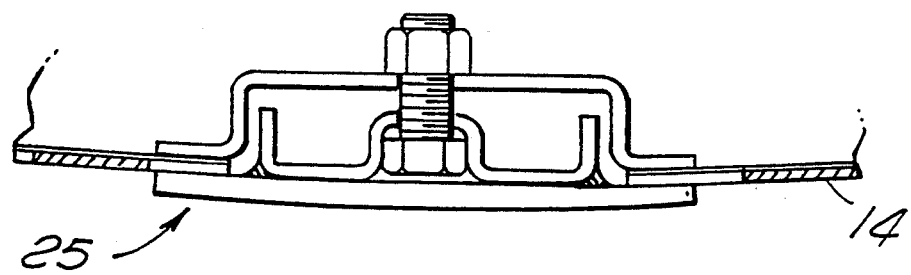
FIG. 12 is an enlarged view of the steel clamp shown in FIG. 3.

The casings 14 and 16 may be manufactured from perforated steel plate, plate with tack-welded wire mesh, double plates with each plate having a different size perforation (for example, a thin plate with small perforations and a thick plate with large perforations) or any other material that will support and maintain the treatment media within the annular space. To further support the casings 14 and 16 and media 36, a plurality of steel bars (not shown) may be secured to each casing extending upwardly from the bottom 24 of the scrubber or the slab 22. Typically, the casings 14 and 16 consists of meshed screens which are clamped by plate holding clamps 25 (see FIGS. 3 and 12) to perforated plates. The plate holding clamps 25 are typically constructed from steel. A plurality of plate holding clamps may be used to secure the casings 14 and 16 within the perforated plates and to adjoin plates longitudinally.

Disposed at the top of the inner casing is a conical feeder 50 having a base 70, an upper tip 72 and a conical surface 74. In the preferred embodiment, the base 70 of the feeder 50 is welded to the top of the inner casing 16 and the upper tip 72 of the feeder is disposed just below the lid 26. The conical surface of the feeder 50 extends upwardly toward center at a preferred minimum angle of 15°. To fill the annular fillspace 40 with treatment media, the cap 34 is opened and media is fed through the opening 30 onto the conical surface 74 which uniformly distributes the media into the space 40 between the casings 14 and 16. The cap should generally be at least 24 inches in diameter for inspection. Activated carbon to be used for the scrubber 10 or other conventional scrubber designs is typically delivered in 1000 lb sacks and packaged with a throat and a string. In accordance with the present invention, the sacks can be hung upside down by a small crane and then, by opening the throat string, the carbon flows through the opening 30 into the tank 10 and distributed in the media space 40 evenly by means of the conical surface 74 which uniformly distributes the media into the space 40.

Circulation of exhaust gas through the scrubber is provided by an inlet pipe 52 and an outlet pipe 54. Inlet pipe 52 and outlet pipe 54 are not permanently secured to the scrubber 10, making them replaceable and removable. The pipes 52 and 54 are secured to the scrubber using non-permanent holding devices, such as gaskets. Preferably, the inlet pipe 52 is connected to an inflow port 18 of the housing 12 and passes through the sleeves attached to the casings 14 and 16 into the corespace 38. The inlet pipe 52 has an inner portion 53 within the corespace 38 which has a pair of openings 56 for the controlled uniform feeding of exhaust gas to the corespace. The inner end of the inlet pipe is not attached to inner spacing 16 nor capped 55. The exhaust gas entering inlet pipe 52 will first impinge on the backplate 55, enter the inner casing 16 through the pair of openings 56, percolate through the carbon from the corespace 38 to the voidspace 42, and exit the scrubber through openings 62, 64 in the housing 12. The exhaust gas exits the housing 12 through an annular duct 60 which is secured to the outside of the housing 12 just below the lid 26 and then through the outlet pipe 54. The air treatment process can occur in either direction, e.g., exhaust air may be introduced into the corespace 38, percolated through the media 36, and then discharged through the housing outflow port as described above, or, alternatively, the exhaust air may be percolated through the media 36 into the corespace 38, and then discharged from the corespace 38. Thus, the stream of exhaust air can be reversed without any modification to the internal of external parts of the scrubber 10. The wall of the housing 12 acts as a moisture knockout during flow path reversal.

The housing 12 may have two pairs of openings (see FIG. 4) through which the exhaust gas flows from the voidspace 42 in the housing 12 to the inside of the annular duct 60. A first pair of openings 62 is near the outlet pipe 54 and a second pair of openings 64 is opposite the outlet pipe 54. Alternatively, any number of openings may be used. Preferably, the size and placement of the openings in the housing are such that air will flow out of all openings in approximately equal volumes. For example, the first pair of openings 62 may be smaller than the second pair of openings 64 since they are closer to the outlet pipe 54. Exhaust gas then flows from the annular duct out of the scrubber through the outlet pipe 54 which is secured to the outside of the housing or to the duct. Further, the annular duct 60 can be bolted and gasketed to the housing 12, in order to be removable.

In operation, contaminant-laden exhaust gas from settling tanks, aeration tanks, etc. is directed to the inlet pipe 52. The gas then flows through the inlet pipe 52 and out of the pair of openings 56 at the inner portion 53 of the inlet pipe and into the corespace 38. The gas then proceeds to flow through the perforations 82 of the inner casing 16 and percolate through the treatment media 36 in the annular fillspace 40. The treated air then flows through the perforations 80 of the outer casing 14, into the voidspace 42 and then out of the housing, through the annular duct 60 and the outlet pipe 54 to be discharged to the atmosphere or directed to other air treatment systems.

The housing must be properly sealed to prevent contaminant-laden exhaust air from short circuiting the treatment media. In particular, the upper portion 46 of the outer casing 14, i.e., the portion of the outer casing that is not perforated, must extend into the treatment media so that exhaust gas is required to flow through the treatment media. Additionally, the annular fillspace 40 between the casings should be carefully filled to prevent voids.

To permit removal of exhausted carbon or other treatment media, a plurality of discharge ports 90 are secured to the lower end of the housing 12. Each discharge port 90 includes a horizontally extending cylindrical pipe 92 (see FIG. 5). The pipe 92 extends through the housing 12 and the outer casing 14 to the carbon media. This will be sleeved and sealed to be removable. A flange support 93 is secured to the outside of the housing adjacent the pipe 92. An annular plate 94 is then secured to the outside end of the pipe 92 and to the flange support 93. A removable plate 95 having a threaded bore 96 is then secured to the annular plate 94 by quick clamps 97. A threaded nipple 98 having a cap 99 is secured to the bore 96. Carbon is removed from the scrubber by simply removing the nipple 98 and then, if necessary, by removing plate 95.

Figure 8:
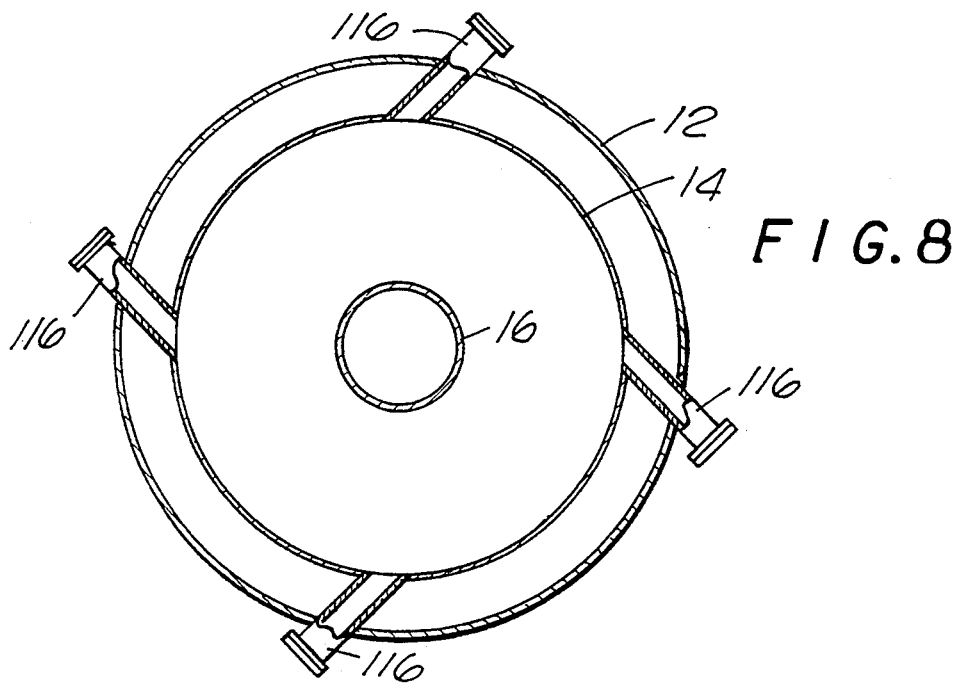
FIG. 8 is a plan view of a second alternative embodiment of a carbon removal port.

Referring to FIGS. 6 and 7, each discharge port may alternatively comprise a narrow pipe 110 that extends inwardly and which has a gradually widened portion 112 that extends to the treatment media 36 adjacent the outer casing 14. The widened portion 112 permits a worker to insert a shovel or vacuum hose, if necessary, to remove the treatment media. Preferably, the pipe 110 widens in the upward direction at approximately a 30° angle and widens to each side at approximately a 25° angle. Quick clamps may be secured to a cover 114 for the pipe 110 to provide ready access. A further embodiment for the discharge ports comprises a plurality of narrow pipes 116, each entering the housing 12 and the outer casing 14 at an angle (see FIG. 8). This variation permits easier removal of carbon accumulating against the outer casing.

To determine if the outer casing 14 is corroded or if treatment media is leaking from the annular fillspace 40, an inspection hatch 120 or hatches may be provided through the housing (see FIG. 2). A removable cover plate 122 may be provided therefor.

Provision is also made for drainage of moisture from inside the housing. In the preferred embodiment, a drain 84 is formed at the center of the bottom 24 of the scrubber to permit drainage of moisture that condenses in the housing. If moisture in the corespace 38 is not a significant problem, drains may be placed at the bottom 24 between the outer casing 14 and the housing 12. In this latter case, the bottom 24 of the scrubber may be sloped downwardly from the center. To enhance drainage of moisture out of the carbon fillspace 40, the lower edges of the inner casing 16 and the outer casing 14 may be cut along the center of the perforations (see FIG. 9). Moisture will then easily drain through the perforations from the fillspace.

In view of the above, the surface area of activated carbon available for adsorption of contaminants in the annular scrubber may now be demonstrated by reference to FIGS. 2 and 4. In the preferred embodiment, a ten foot high, ten foot diameter, cylindrical housing 12 is filled with activated carbon 36 to a depth of approximately nine feet. The inner casing 16 has a two foot diameter and the outer casing 14 has an eight foot diameter, providing a three foot layer of carbon in the fillspace 40 (which conforms to the usual design criteria for treatment of air with carbon). The effective diameter ($d_e$) of the carbon is the midpoint of the carbon, i.e., $d_e$ equals the diameter of the inner casing plus the width of the carbon ($d_e$=five feet). Accordingly, the effective surface area of the carbon equals $\pi d_e(h)$ or approximately 140 square feet. The prior art scrubber in FIG. 1 having the same ten foot diameter would result in a carbon surface area of $\pi d^2/4$ or only approximately 80 square feet (over 40% less). Increasing the height of the scrubber in FIG. 2 would further increase the carbon surface area while no benefits would result by increasing the height of the prior art device.

It should be recognized that many different sized scrubbers of the type disclosed herein may be used. The following basic sizing formulas may be used:

$$\text{Diameter of inlet/outlet pipe } (D) = \sqrt{\frac{CFM}{500\pi}} \text{ to } \sqrt{\frac{CFM}{1000\pi}}$$

$$\text{Diameter of inner casing } (D1) = \sqrt{\frac{CFM}{500\pi}}$$

$$\text{Height of carbon bed } (h) = \frac{CFM}{50\pi (D1 + \text{width of bed})}$$

Although the invention herein has been described with reference to particular embodiments, it is to be understood that these embodiments are merely illustrative of the principles and applications of the present invention. For example, the casings need not be cylindrical to obtain the benefits of the present invention, nor is it required that the exhaust air initially be fed into the inner corespace. Consequently, the specific structural and functional details disclosed herein are merely representative and are deemed to afford the best embodiments known at this time. Furthermore, it is to be understood that numerous modifications may be made to the illustrative embodiments and that other arrangements may be devised without departing from the spirit and scope of the present invention as defined by the appended claims.

What is claimed is:

1. A scrubber for holding a treatment media that removes contaminants from exhaust air, comprising:
   a housing defining a horizontal, removable inflow port and a horizontal, removable outflow port;
   a removable outer casing disposed inside the housing, the outer casing having perforations around its perimeter along a substantial portion of its surface, the outer casing and the housing defining a voidspace between them;
   a removable inner casing disposed inside the outer casing, the inner casing having perforations around its perimeter along a substantial portion of its surface, the inner casing enclosing a corespace and the inner casing and outer casing defining a fillspace between them for receiving the treatment media;
   the inner casing and the outer casing being structurally unattached to the housing; and
   means for directing a stream of exhaust air through the treatment media between the corespace and the voidspace.

2. The scrubber of claim 1 wherein the inner casing and the outer casing are cylindrically shaped and independently disposed upright within said housing.

3. The scrubber of claim 2 wherein the inner and outer casings are concentric.

4. The scrubber of claim 3 wherein said means for directing a stream of exhaust air further comprises:
   a pipe wherein one end of the pipe communicates with the corespace, the other end of the pipe communicates with the inflow port, and the pipe is removable and horizontally disposed.

5. The scrubber of claim 4 wherein said inflow port is aligned perpendicular to side of said housing.

6. The scrubber of claim 5 wherein said pipe is capped for impingement protection and exhaustion of treatment media.

7. The scrubber of claim 6 further comprising:
   means for uniformly distributing the treatment media in the fillspace between the inner and outer casings.

8. The scrubber of claim 7 further comprising:
   means for removing the treatment media from the fillspace.

9. The scrubber of claim 8 wherein said means for removing the treatment media from the fillspace further comprises:
   a plurality of pipes disposed between the outer casing and the housing near the bottom of the housing.

10. The scrubber of claim 9 wherein the pipes extend horizontally through the outer casing and the housing to the treatment media.

11. The scrubber of claim 10 further comprising:
    means for reversing the direction of the stream of exhaust air through the scrubber without modification to the internal or external parts of the scrubber.

12. The scrubber of claim 11 wherein the scrubber holds a single treatment media, and is at minimum 9 feet in diameter and 6 feet in height.

13. A scrubber for holding a treatment media that removes contaminants from exhaust air, comprising:
    a housing defining a horizontal, removable inflow port and a horizontal, removable outflow port and having a cap including an opening to permit uniform feeding of treatment media into the housing;
    a removable outer casing disposed upright inside the housing and having perforations around its perimeter along a substantial portion of its height, the outer casing and the housing defining a voidspace between them;

a removable inner casing disposed upright inside the outer casing and having perforations around its perimeter along a substantial portion of its height, the inner casing enclosing a corespace and the inner casing and outer casing defining a fillspace between them for receiving the treatment media;

the inner casing and the outer casing being structurally unattached to the housing;

means for directing a stream of exhaust air through the treatment media between the corespace and the voidspace; and means for directing the treatment media supplied through the cap opening into the fillspace between the inner and outer casings.

14. The scrubber of claim 13 wherein the horizontal inflow port and the horizontal outflow port causes the scrubber to have a low profile.

15. The scrubber of claim 14 wherein the inner and outer casings are manufactured from material that will maintain and support the treatment media within the annular space.

16. The scrubber of claim 15 wherein the material comprises a plurality of meshed and perforated plates.

17. The scrubber of claim 16 further comprising:
clamping means for holding the plates together.

18. The scrubber of claim 17 wherein the meshed and perforated plates are removable and replaceable.

19. The scrubber of claim 18 wherein the housing can be manufactured from fiberglass, sheet metal or concrete.

20. The scrubber of claim 19 wherein the means for directing treatment media permits uniform filling of the fillspace between the inner and outer casings.

21. The scrubber of claim 20 wherein the housing further includes a top lid and the scrubber can be filled or emptied without disturbing the inlet piping or the outlet piping even when the top lid is opened for inspection.

22. The scrubber of claim 21 wherein the casings are cylindrically shaped and concentric, and the means for directing the treatment media further comprises:
a single, centrally located, conically shaped member wherein the tip of the conically shaped member is near the cap opening and the perimeter of the base of the conically shaped member is near the perimeter at the top of the inner casing.

23. The scrubber of claim 22 wherein the cap is connected to the top lid which together form the top of the housing and wherein the outer casing has an upper portion that is not perforated around its perimeter, the upper portion extending downwardly from a location near the lid to a location at or below the base of the conically shaped member.

24. The scrubber of claim 23 further comprising means for removing treatment media from the fillspace without adding to scrubber height.

25. The scrubber of claim 24 wherein said means for removing treatment media is a plurality of pipes disposed between the outer casing and the housing near the bottom of the housing, the pipes extending horizontally through the outer casing and the housing to the treatment media.

26. The scrubber of claim 25 wherein each pipe has a widened portion that defines a larger opening near the outer casing than near the housing.

27. The scrubber of claim 26 further comprising:
a bottom having a flat, unsuspended and independently supported surface.

28. The scrubber of claim 27 wherein the stream of exhaust air is directed through the treatment media between the corespace and the voidspace by a known flow path, the known flow path consisting of exhaust air flowing through the perforations of the inner casing, percolating through the treatment media into the fillspace, flowing through the perforations of the outer casing into the voidspace and then out of the housing through the outflow port.

29. The scrubber of claim 28 further comprising:
a horizontal inlet pipe connected to the inflow port of the housing and passing through the inner and outer casings into the corespace; and
an inlet cap disposed at the inner end of the inlet pipe for preventing the exhaust air from short circuiting through the treatment media as the exhaust air enters the inner casing.

30. The scrubber of claim 29 wherein the housing has a flat top.

31. The scrubber of claim 30 further comprising:
means for reversing the direction of the stream of exhaust air through the scrubber without any modification to the internal or external parts of the scrubber.

32. The scrubber of claim 31 further comprising:
means for separating moisture particles during reversal of the stream of exhaust air.

33. The scrubber of claim 32 wherein said means for separating moisture particles further comprises:
means for utilizing a wall of the housing as a moisture knockout during reversal.

34. The scrubber of claim 33 wherein the inlet pipe has an inner portion within the corespace which has a pair of openings for the controlled uniform feeding of exhaust gas to the corespace.

* * * * *